United States Patent [19]

Sacks

[11] Patent Number: 4,603,430
[45] Date of Patent: Jul. 29, 1986

[54] TARGET DISCRIMINATION UTILIZING MEDIAN FILTERS

[75] Inventor: Jack M. Sacks, Thousand Oaks, Calif.

[73] Assignee: Hughes Aircraft Company, Los Angeles, Calif.

[21] Appl. No.: 653,114

[22] Filed: Sep. 21, 1984

[51] Int. Cl.⁴ .............................................. G06K 9/52
[52] U.S. Cl. ...................................... 382/28; 382/41; 356/335
[58] Field of Search ........................ 382/41, 34, 27, 28; 358/138; 333/165, 166, 167; 356/335, 394

[56] References Cited

U.S. PATENT DOCUMENTS 4,136,957   1/1979   Uno et al. ............................ 356/394

Primary Examiner—David K. Moore
Assistant Examiner—Jacqueline Todd
Attorney, Agent, or Firm—Charles D. Brown; A. W. Karambelas

[57] ABSTRACT

Apparatus for processing applied signals indicative of an image scene in order to provide output signals representative of objects in the scene whose sizes are within a predetermined size range. Combinations of median and anti-median filters are employed in serial and parallel configurations to produce the desired size filtering. The basic system comprises first filter means for providing first output signals indicative of objects whose sizes are within a first preselected size range. Second filter means are employed which provide second output signals indicative of objects whose sizes are within a second preselected size range. At least one of the two preselected size ranges contain object sizes within the predetermined size range. Circuit means are provided for coupling the output signals from the two filters in a manner which generates output signals indicative of objects whose sizes are within the predetermined range. A method of processing applied signals to generate output signals containing objects whose sizes are within a predetermined size range is also disclosed.

5 Claims, 10 Drawing Figures

TARGET DISCRIMINATION UTILIZING MEDIAN FILTERS

BACKGROUND OF THE INVENTION

The present invention relates generally to size discrimination systems and methods, and more particularly to size discrimination systems and methods which implement nonlinear median filtering techniques.

State-of-the-art digital target identification systems utilize numerous image processing techniques to eliminate noise and unwanted clutter from images processed thereby. For example, impulse noise may be removed from a video image by means of what is referred to as a median of medians operator. This is a computer algorithm which is implemented in hardware that processes digital video signals by means of median filters.

The median of medians image processing technique is discussed in "Investigation of VLSI Technologies for Image Processing," by W. L. Eversole et al, in the *Proceedings of the IEEE*, Image Understanding Workshop, at page 10. A copy of that article is enclosed herewith and incorporated herein by reference. As mentioned in the paper, a video image corrupted by impulse noise was passed through circuitry which implemented the median of medians operation. As stated in the article, the filtered image removed the impulse noise, but previously sharp edges were blurred.

A second article by Eversole et al, entitled "Investigation of VLSI Technologies for Image Processing," *Proceedings of the IEEE*, Image Understanding Workshop, November 1978, at page 191, further discusses the use of median filtering for noise reduction purposes. As indicated in this paper, median filtering is a nonlinear signal processing technique for noise suppression in images.

The median filter comprises a sliding window encompassing an odd number of pixels. The center pixel in the window is replaced by the median of the pixels within the window. The median pixel value is that pixel value for which half of the pixel values are smaller or equal in value and half are larger or equal in value. In general, median filtering is more effective in reducing the effect of discrete impulse noises than smoothly generated noise.

In "Image Understanding Architecture," by Graham R. Nudd, in a publication by the National Computer Conference, 1980, at page 377, a wide variety of image processing techniques are discussed. In particular, the use of median filtering is mentioned as it pertains to elimination of noise spikes, and use in other statistical operations such as histogramming, variance and mode filtering.

Mention is also made of the fact that median filters may be used as a size filter, and that they are widely used as such. However, this statement is not believed to be true. A diligent search of the art relevant to size filtering indicates that, heretofore, size filtering has not been performed by means of median filters. In addition, this article does not mention how such size filtering is implemented nor is there any discussion of details regarding how this could be accomplished.

In current state-of-the-art target recognition systems, and the like, it is necessary to categorize potential targets and distinguish them from background clutter and non-target objects. Various criteria may be employed to distinguish target objects from non-targets, including size, shape, or motion-oriented attributes, or the like.

Size determination is a significant discriminant in determining the presence of potential targets located in an image scene. Determining the relative sizes of potential targets and more importantly, excluding those objects from the image which are clearly not potential targets would be very advantageous.

SUMMARY OF THE INVENTION

Accordingly, it is an object of the present invention to provide a system and method which may be employed to determine target objects present in an image scene on the basis of their relative size.

It is a further object of the present invention to provide a system and method for discriminating target size which employs nonlinear median filtering techniques.

In accordance with these and other objects of the present invention, a size discrimination system is provided which processes digitized image data and generates output signals which are indicative of objects whose sizes are in a predetermined size range. Objects whose sizes are outside the predetermined range are removed from the image. The system employs median and anti-median filter combinations to accomplish the desired size filtering.

The system comprises first filter means for processing applied digitized signals (pixels) in order to discriminate objects which have a size within a first preselected range of sizes, and for providing first output signals indicative of objects whose sizes are within the first range. Second filter means processes the signals in order to discriminate objects which have a size within a second preselected range of sizes, and for providing second output signals indicative of objects whose sizes are within the second range.

At least one of the first and second preselected ranges include objects sizes which are within the predetermined size range. Third means comprising circuit means are coupled to the first and second filter means for coupling output signals from the first and second filters in a manner which generates the output signals which are indicative of only those objects whose sizes are in the predetermined size range. Such coupling may, for example, include a difference function.

The size discrimination system of the present invention may comprise median and/or anti-median filter combinations. The median filter transmits signals indicative of objects whose sizes are larger than a particular size limit. The anti-median filter transmits signals indicative of objects whose sizes are smaller than a predetermined limit. Appropriate combining of the filter types allows for selective processing of object sizes in any predetermined size range. In general, the size of object passed by the filter is related to the size of the window of the filter.

One specific embodiment of the size discrimination system of the presnt invention comprises an anti-median filter serially coupled to a median filter. This combination comprises a bandpass arrangement in which the anti-median filter passes signals indicative of objects whose sizes are below an upper limit of the predetermined range of object sizes. The median filter then processes the signals output from the anti-median filter and passes only signals indicative of objects whose sizes are above a lower limit of the predetermined range. Accordingly, the output signals from the combination are indicative of objects whose sizes are within the predetermined range.

A second specific embodiment is the counterpart of the above-described embodiment, wherein a median filter is followed serially by an anti-median filter. It should be clear that substantially the same bandpass filter arrangement is accomplished by this combination.

Another embodiment of the size discrimination system comprises a parallel combination of median filters having separate size bandpass cutoffs which correspond to the upper and lower limits of the predetermined size range, respectively. The signal outputs of the two parallel median filters are then processed by a differencing circuit which subtracts the two signal outputs. These difference signals comprise signals which are indicative of objects whose sizes are within the predetermined range.

The counterpart of the above-described parallel filter combination is a parallel filter embodiment comprised of anti-median filters whose bandpass cutoffs represent the upper and lower limits of the predetermined size range, respectively. A differencing circuit combines the output signals from the two anti-median filters in the same manner as described above. It should be clear that this anti-median filter combination accomplishes substantially the same result as the prallel median filter combination.

The present invention also provides for a method of processing applied signals representative of an image scene and which produces output signals indicative of objects from the image scene that have sizes within a predetermined size range. The basic method comprises the steps of processing applied signals to provide first output signals indicative of objects that have a size within a first preselected size range. The second step is processing applied signals to provide second output signals indicative of objects that have a size within a second preselected size range.

At least one of the two size ranges include sizes within the predetermined size range. The final step is coupling the signals from the first and second steps in a manner which provides output signals indicative of objects whose sizes are within the predetermined range.

BRIEF DESCRIPTION OF THE DRAWINGS

The various objects and features of the present invention may be more readily understood with reference to the following detailed description taken in conjunction with the accompanying drawings, wherein like reference numerals designate like structural elements, and in which:

FIG. 2a illustrates a first embodiment of a size discrimination system of the present invention;

FIG. 2b illustrates the filtering operation of the size discrimination system of FIG. 2a;

FIG. 3a illustrates a second embodiment of a size discrimination system of the present invention;

FIG. 3b illustrates the filtering operation of the size discrimination system of FIG. 3a;

FIG. 4a illustrates a third embodiment of a size discrimination system of the present invention;

FIG. 4b illustrates the filtering operation of the size discrimination system of FIG. 4a;

FIG. 5a illustrates a fourth embodiment of a size discrimination system of the present invention;

FIG. 5b illustrates the filtering operation of the size discrimination system of FIG. 5a.

DETAILED DESCRIPTION OF THE INVENTION

Figure 1:
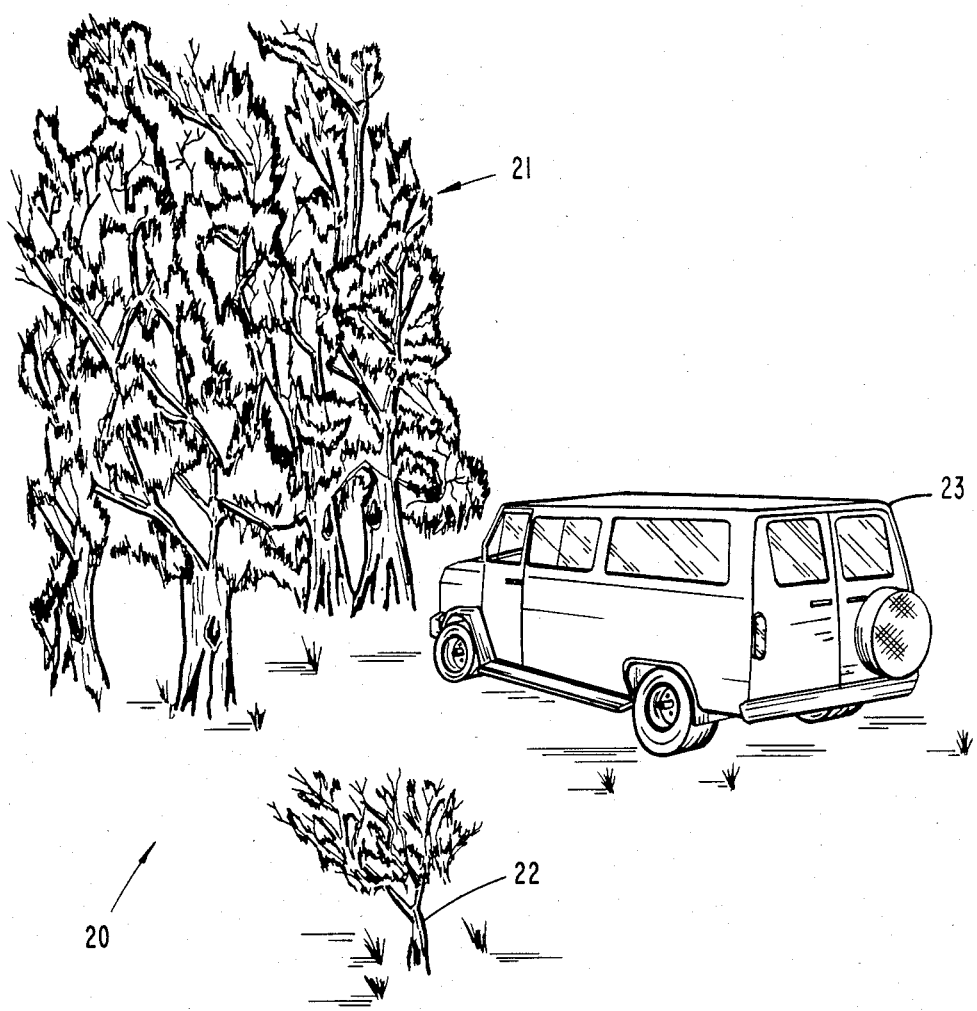
FIG. 1 illustrates a typical image scene containing objects of different size which is processed by the size discrimination system of the present invention.

Referring to FIG. 1, a drawing representative of an image scene 20 containing objects having a variety of different sizes is shown. For example, the image scene 20 may include a forest 21, a tree 22, and a truck 23, or similarly sized objects.

The present invention is generally employed as part of an image processing system, or target acquisition system, or the like. The purpose of the system is to identify and acquire target objects in the image scene 20. The imaging portion of the system may be a video or infrared imaging system operating in the visible or infrared portions of the spectrum, or a synthetic aperture radar system, or the like. These imaging systems produce digitized output signals, similar to video signals, which are representative of an image scene viewed thereby, such as the image scene 20 of FIG. 1. The size discrimination system of the present invention is employed to filter applied signals representative of the image scene 20 and provide a filtered output signal which has removed unwanted objects from the image scene 20, leaving only objects of potential interest.

The present invention employs the use of median and anti-median filters. The median filter is comprised of a sliding window encompassing an odd number of pixels. The value of the center pixel in the window is replaced by the value of the median of the pixels within the window. The median pixel value is that pixel value for which half of the pixel values are smaller or equal in value and half are larger or equal in value. The median filter is nonlinear since the sum of medians is not equal to the median of sums.

The median filter passes applied signals indicative of objects whose sizes are larger than a predetermined size. The anti-median filter is obtained by substracting a median filter value from the original applied input signal value at each pixel in the window. This is accomplished by passing applied signals and output signals from a median filter through a differencing circuit. The result is that the anti-median filter passes signals indicative of objects which are smaller than a predetermined size.

Median filters are well known in the image processing art. Several examples of median filters inculde U.S. Pat. Nos. 4,439,840 entitled "Real-Time Ordinal-Valued Filters Utilizing Partial Intra-Data Comparisons" and 4,441,165 entitled "Real-Time Ordinal-Value Filters Utilizing Complete Intra-Data Comparisons," both issued to Guy B. Coleman et al. Also, presently co-pending patent applications entitled "Real-Time Ordinal-Value Filter Utilizing Reference Function Comparison," by G. B. Coleman et al, Ser. No. 575,107, filed Jan. 30, 1984, and "Real-Time Ordinal-Value Filter Utilizing Half-Interval Ranking," by F. A. Carter et al, Ser. No. 306,179, filed Sept. 28, 1981, describe two additional median filter arrangements which may be employed in the present invention. All of the above-indicated patents and patent applications are assigned to the assignee of the present invention.

The median filter as described herein is implemented by processing data from a cross-shaped window of pixels (windows of other shapes may also be used) in the image plane. The cross-shaped window may vary in size from three-by-three to fifteen-by-fifteen (or more) elements in size. Each element of the window is loaded with pixel data from the original image.

The cross-shaped window is initialized to start in the top left hand corner of the image and is passed over the entire image pixel by pixel. At each position in the scene, the pixel magnitudes located within the elements of the window are sorted from the highest to lowest. The middle number in the list is the median of the list of numbers. This value has an equal amount of numbers lower and greater than it, and is usually different from the average. By passing the window over the scene, objects in the scene having a size smaller than N/2 by N/2 pixels (where N is the number of elements analogous to the width of the window, e.g., N=3 for 3×3, N=15 for a 15×15 window) are filtered out, and objects having a size greater than N/2 by N/2 pixels are passed by the filter. When two median filters having different sized windows are employed as described below, the large window median filter removes all objects less than one-half the size of the large window and the small window median filter removes all objects smaller than one-half the size of the small window. The objects remaining, after differencing the output of the two filters, are larger than one-half the size of the small window and smaller than one-half the size of the large window.

Figures 2A, 2B:
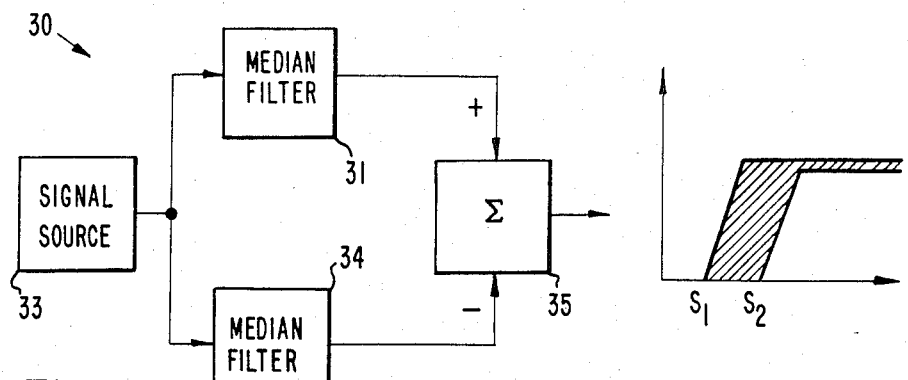

Accordingly, and referring to FIG. 2a, there is shown a first embodiment of a size discrimination system 30 in accordance with the present invention. The system 30 comprises a first median filter 31, which is coupled to a signal source 33, such as a video camera system, or infrared sensor system, or the like. The signal source 33 provides digitized output signals representative of the image scene 20 of FIG. 1. The first median filter 31 processes applied signals and provides first output signals indicative of objects whose sizes are within a first preselected size range. For example, the first median filter 31 filters objects whose sizes are larger than a lower size limit of the predetermined range. This limit may be set at a size which is smaller than the truck 23, but larger than the tree 22 in FIG. 1, for example.

A second median filter 34 is coupled in parallel to the signal source 33 and processes the applied signals to provide second output signals indicative of objects whose sizes are within a second preselected size range. The second median filter 34 filters objects whose sizes are larger than an upper limit of the predetermined size range. This limit may be set at a size which is larger than the truck 23 but smaller than the forest 21, for example.

The signal outputs of the first and second median filters 31, 34 are coupled to a differencing circuit 35. The differencing circuit 35 processes the first and second output signals to provide third output signals which are the differences therebetween. The third output signals from the differencing circuit 35 include signals representative only of objects having a size within the predetermined size range. The differencing circuit 35 comprises means for coupling the signals from the two median filters 31, 34 to generate output signals which are indicative of objects whose sizes are in the predetermined size range.

FIG. 2b illustrates the filtering performed by the first and second median filters 31, 34, respectively. The first median filter 31 passes objects larger than size S1. The second median filter 34 passes objects whose sizes are greater than size S2. The differencing circuit 34 substracts the output of the second filter 34 from the first filter 31 (S1-S2) which then is indicative of objects whose sizes are within the predetermined size range; namely, between sizes S1 and S2.

Figures 3A, 3B:
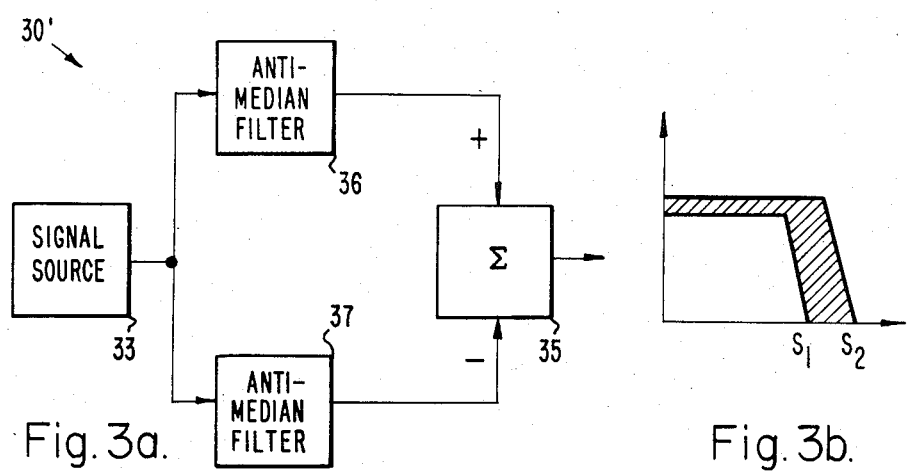

Referring to FIG. 3a, a second embodiment of the size discrimination system 30' of the present invention is shown. This embodiment is the anti-median counterpart of the embodiment of FIG. 2. First and second anti-median filters 36, 37 are coupled in parallel between the signal source 33 and the differencing circuit 35. The design and operation of this arrangement is substantially the same as the embodiment of FIG. 2a. The filtering operation of the parallel anti-median filter combination is shown in FIG. 3b.

Substantially the same size range may be obtained by this filter combination as in the first embodiment. However, processing time is longer than in the first embodiment since each anti-median filter 36, 37 must perform its own differencing operation prior to application of signals to the differencing circuit 35.

Figures 4A, 4B:
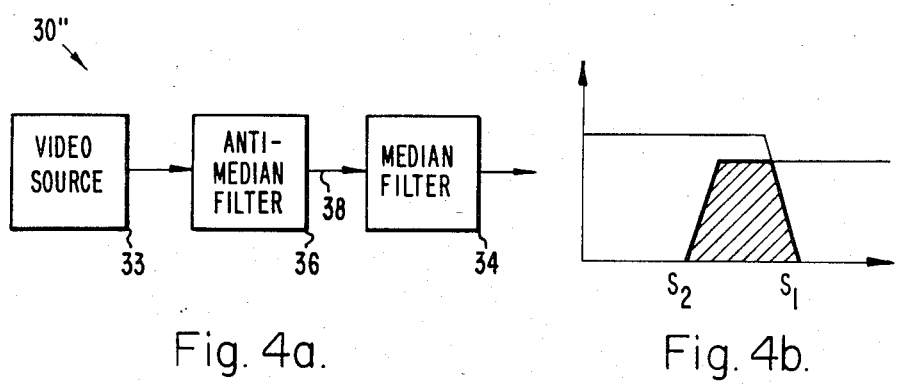

FIG. 4a shows a third embodiment of a size discrimination system 30" in accordance with the principles of the invention. The system 30" comprises an anti-median filter 36 serially coupled to a median filter 34. The means for coupling the signals to produce the desired size filtered output comprises the electrical connection 38 between the two filters 36, 34.

The system 30" operates such that the anti-median filter 36 passes objects having a size which is smaller than the first predetermined size. This size is selected to be larger than the truck 23 of FIG. 1, and hence an upper bound of the predetermined size range. The median filter 34 then processes the signals from the anti-median filter 36 and filters out those objects which are larger than the second predetermined size. This size is chosen to be smaller than the size of the truck 23 of FIG. 1, and represents a lower bound of the predetermined size range. Consequently, only signals indicative of objects which have sizes that are between the two size limits are passed by the filter combination. The filter operation of this embodiment is illustrated in FIG. 4b.

Figures 5A, 5B:
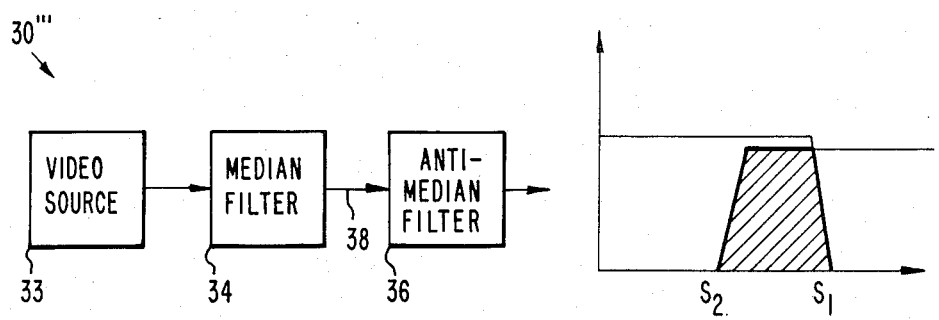

FIG. 5a illustrates a fourth embodiment of a size discrimination system 30''' in accordance with the present invention. The system 30''' is a reversed serial filter combination which is substantially the same as the embodiment of FIG. 4a. The embodiment of FIG. 5a has the median and anti-median filters 34, 36 reversed in position. The system operates substantially the same as the system of FIG. 4a, and the filtering operation of this embodiment is shown in FIG. 5b.

Figure 6:
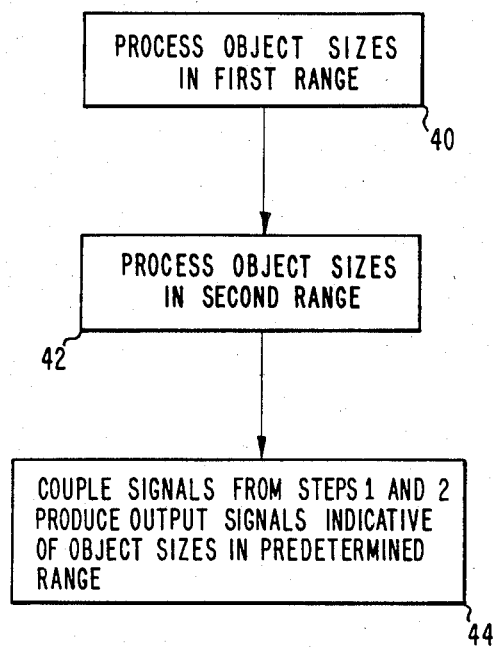
FIG. 6 illustrates a basic method of size discrimination in accordance with the principles of the present invention.

Referring to FIG. 6, a method of size discrimination in accordance with the present invention is shown. The method may be employed in processing video or other similar signals indicative of objects having various sizes, and is used to generate output signals that are representative of only objects whose sizes are within a predetermined size range.

The first step in the method is processing the applied signals by means of a first filter to provide first output signals indicative of objects having a first preselected size range, as indicated in box 40. The second step is processing the signals by means of a second filter to provide second output signals indicative of objects having a second preselected size range, as indicated in box 42. The final step is coupling the first and second output signals in a manner which produces output signals indicative of objects whose sizes are within the predetermined size range, as indicated in box 44.

Thus, there has been described various embodiments of a new and improved system and an improved method for processing digitized signals in order to filter applied signals to remove objects that are not within a predetermined size range. Only signals indicative of objects having sizes within a predetermined size range pass through the filter system. The system and method may employ various combinations of median and anti-median filters to accomplish the desired filtering.

It is to be understood that the above-described embodiments are merely illustrative of some of the many specific embodiments which represent applications of the principles of the present invention. Clearly, numerous and varied other arrangements may be designed by those skilled in the art without departing from the spirit and scope of the invention.

What is claimed is:

1. A size discrimination system for use in an image processing system which provides output signals indicative of objects whose sizes are within a predetermined size range, said system comprising:
   a source of signals representative of the content of an image scene;
   an anti-median filter for processing said signals and providing first output signals indicative of objects in said scene whose sizes are within a first preselected size range;
   a median filter for processing said signals and for providing second output signals indicative of objects whose sizes are within a second preselected size range;
   at least one of said first and second preselected size ranges including object sizes which are within said predetermined size range; and
   circuit means coupled to said median filter and anti-median filter for coupling output signals from said filters in a manner which provides output signals which are indicative of objects whose sizes are in said predetermined size range.

2. The size discrimination system of claim 1 wherein:
   said anti-median filter passes signals indicative of objects whose sizes are below an upper limit of said predetermined size range; and
   said median filter is serially coupled to said anti-median filter by way of said circuit means for processing output signals provided thereby, and for passing signals indicative of objects whose sizes are above a lower limit of said predetermined size range;
   said median filter providing output signals indicative of objects whose sizes are within said predetermined size range.

3. The size discrimination system of claim 1 wherein:
   said median filter passes signals indicative of objects whose sizes are above a lower limit of said predetermined size range; and
   said anti-median filter is serially coupled to said median filter by way of said circuit means for processing output signals provided thereby, and for passing signals indicative of objects whose sizes are below an upper limit of said predetermined size range;
   said anti-median filter providing output signals indicative of objects whose sizes are within said predetermined size range.

4. A size discrimination system for use in an image processing system which provides output signals indicative of objects whose sizes are within a predetermined size range, said system comprising:
   a source of signals representative of the content of an image scene;
   a first median filter coupled to said representative signals and which passes signals indicative of objects whose sizes are above an upper limit of said predetermined size range;
   a second median filter coupled to said representative signals and coupled in parallel with said first median filter for passing signals indicative of objects whose sizes are above a lower limit of said predetermined size range; and
   said circuit means comprises a differencing circuit coupled to outputs of said first and second median filters for subtracting the output signals from said first median filter from the output signals from said second median filter to provide output signals indicative of objects whose sizes are within said predetermined size range.

5. A size discrimination system for use in an image processing system which provides output signals indicative of objects whose sizes are within a predetermined size range, said system comprising:
   a source of signals representative of the content of an image scene;
   a first anti-median filter coupled to said representative signals and which passes signals indicative of objects whose sizes are below an upper limit of said predetermined size range;
   a second anti-median filter coupled to said representative signals and coupled in parallel with said first anti-median filter for passing signals indicative of objects whose sizes are below a lower limit of said predetermined size range; and
   said circuit means comprises a differencing circuit coupled to outputs of said first and second anti-median filters for subtracting the output signals from said second anti-median filter from the output signals from said first anti-median filter to provide output signals indicative of objects whose sizes are within said predetermined size range.

* * * * *